April 19, 1949.  P. A. SIDELL  2,467,505
FUME EXHAUST SYSTEM
Filed Sept. 25, 1944  2 Sheets-Sheet 1

INVENTOR.
PHILIP A. SIDELL
BY
ATTORNEY

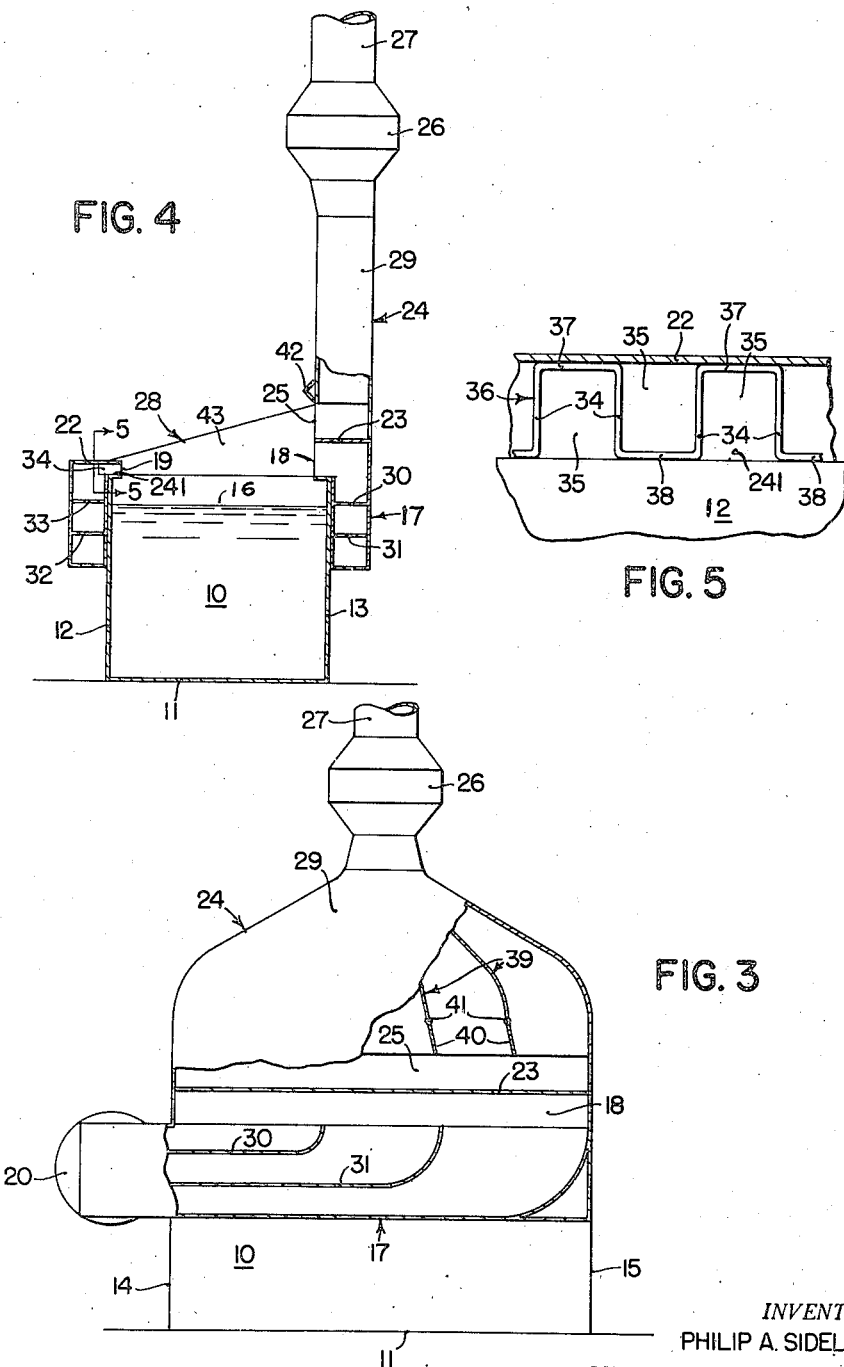

Patented Apr. 19, 1949

2,467,505

UNITED STATES PATENT OFFICE 2,467,505

FUME EXHAUST SYSTEM

Philip A. Sidell, Rock Island, Ill., assignor to American Machine and Metals, Inc., New York, N. Y., a corporation of Delaware Application September 25, 1944, Serial No. 555,700

13 Claims. (Cl. 98—36)

This invention relates to an exhaust system for the removal of odors, fumes or vapors from open tanks.

More especially the invention relates to the removal of odors, fumes and vapors arising from the tops of open tanks with a smaller loss of heated ambient air than by previously-known methods, of drawing off fumes, and likewise with a smaller loss of the contents of the tanks by evaporation.

Fumes are commonly removed from a working space containing an open tank by an exhaust system that draws the ambient air in near the rear of the tank and discharges at a point outside of the building.

The operation is improved by projecting the air under pressure horizontally across the tank by nozzles directed toward the exhaust inlet at the back of the tank.

Pennock in Patent 1,254,725 shows such an arrangement combined with the recirculation of a part of the air exhausted.

It has now been discovered that by providing a closed recirculation system discharging air through a nozzle across the top of the open tank and drawing the air in by suction at the rear end of the tank the air becomes saturated and the evaporation of the liquid is greatly reduced. It has further been discovered that by providing an exhaust system whose inlet is at the back of the tank immediately above the recirculation inlet only a small quantity of air need be removed to catch such vapors, fumes or odors as may have escaped from the recirculating blanket. Whirls and eddies unavoidably cause a portion of the upper surface of the blanket to become intermingled with the ambient air. This intermingled air is carried backward toward the two suction openings by friction with the blanket and the surplus air is discharged into the exhaust system.

It is an object of this invention to provide an improved method and exhaust system for the removal of odors, fumes or vapors from an open tank working more economically than existing systems.

A further object of the invention is to provide an exhaust method and system for an open tank wherein a blanket of air is recirculated over the top of the tank in such a manner that the blanket becomes sufficiently concentrated with the odors, fumes or vapors arising from the tank to keep further evaporation from the tank within desirably low limits.

It is a further object of the invention to provide an exhaust method and system for an open tank wherein the recirculating blanket just mentioned is supplied with fresh air only to an extent which will permit this recirculating blanket to attain and maintain a temperature which approximates that of the contents of the tank.

A further object of the invention is to provide in an exhaust method and system for the removal of odors, fumes or vapors arising from an open tank means for producing and moving across the top of said tank two closely superimposed blankets of air, each of said blankets being moved by a separate power means.

It is a further object of the invention to provide an exhaust method and system for an open tank wherein two power-moved blankets of air are employed, one of these blankets being recirculated over the top of the tank by one power means and the second blanket, traveling adjacent to the first blanket also across the top of the tank, being moved to exhaust by the second power means.

It is a still further object of the invention to provide an exhaust method and system for an open tank wherein two closely superimposed blankets of air are moved across the top of the tank by means of two power means, the power means for moving the upper blanket being of substantially lesser power than the power means which recirculates the lower blanket.

A further object of the invention is to provide an exhaust system for the removal of odors, fumes or vapors arising from an open tank wherein two ducts having their inlet openings arranged one above the other at the rear end of the tank have each located therein a power driven ventilator and at least one of said two ducts has partitioning means for dividing the respective duct or ducts lenthwise into a plurality of channels.

Other objects and advantages of the invention will appear as the description proceeds, reference being had to the accompanying drawings in which:

Fig. 3 is a rear elevation, partly in section, taken along the line 3—3 in Fig. 2;

Fig. 4 is a section along line 4—4 in Fig. 2; and

Fig. 5 shows on a larger scale a fragmentary sectional view taken along line 5—5 in Fig. 4.

Figures 1, 2:
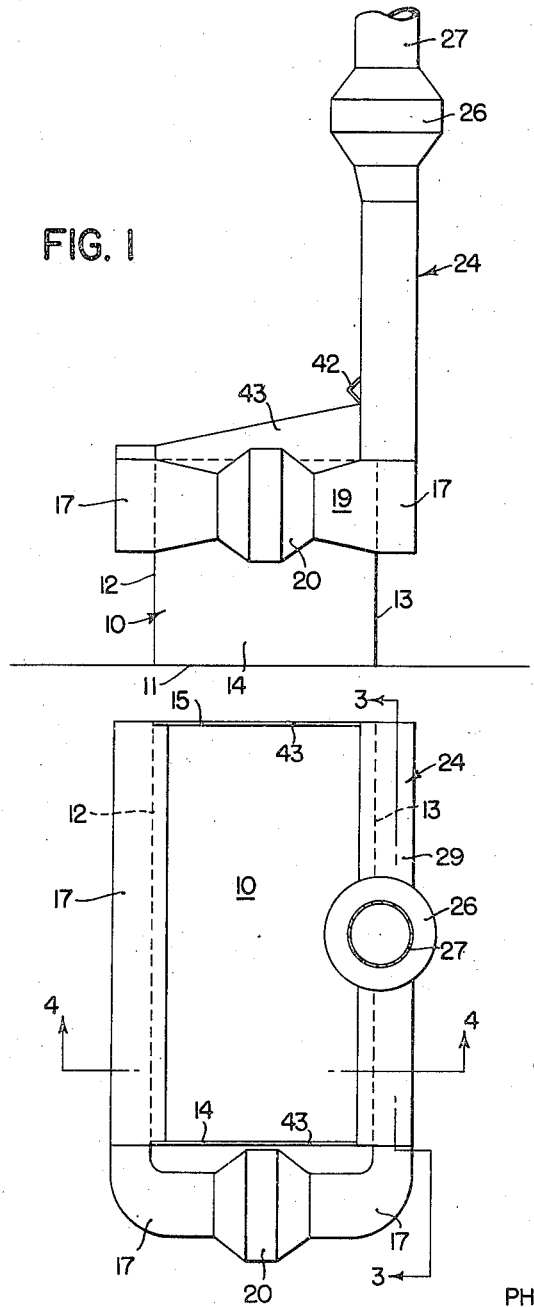
Fig. 1 is an end elevation of a tank equipped with an exhaust system representing one embodiment of the invention.
Fig. 2 is a plan view of the device shown in Fig. 1.

10 denotes a tank having a bottom 11, a front wall 12, a rear wall 13 and two side walls 14 and 15. The term "tank" as used herein is intended to cover any suitable container. The tank 10 contains a fluid heavier than air which may be, and usually is, a liquid which fills the tank up to a desired level, such as indicated at 16 in Fig. 4. Pipes not shown may be employed for supplying the tank, for admitting heating or cooling fluids, etc.

An air duct 17 having an inlet opening 18 extending along substantially the whole length of the edge of the rear wall 13 of the tank 10 and an outlet opening 19 extending along substantially the whole length of the edge of the front wall 12 of the tank contains an air moving means 20 suitable for driving the air in one direction, such as by creating suction in front of it and pressure behind it. As such an air moving means or ventilator a bifurcator of the kind described in U. S. Patent 1,702,632 may be used advantageously. Since this bifurcator is shown and described in detail in that patent, it needs no detailed description here. The outlet opening 19 of the duct 17 forms an elongated nozzle whose cross-section is preferably smaller than that of the inlet opening 18. The lower edge 241 of this nozzle rests upon or forms the top of the tank 10 and the top side 22 of the nozzle may form a shelf over which the operator bends and on which he may place or support work pieces preparatory to or after their treatment in the tank. The inlet opening 18 is delimited at the top by a horizontal plate 23.

Arising above the plate 23 in the form of a hood is a second air duct generally indicated at 24. In this duct 24 which has an inlet opening 25 extending parallel to and immediately above the inlet opening 18 of the duct 17 a separate air moving means 26, such as again a bifurcator according to U. S. Patent 1,702,632, is provided. The pressure side of the bifurcator or other ventilating means 25 in the second air duct connects to an exhaust pipe 27 leading to a discharge opening (not shown) outside of the work space.

The ventilator 20 in the duct 17 sucks air into this duct through the inlet opening 18 and blows it through the outlet nozzle 19 across the top of the tank 10 towards said inlet opening 18. Thereby a blanket of air is circulated over the top of the tank which carries with it the odors, fumes or vapors arising from the liquid in the tank. Only a relatively small fraction of the fume carrying air is permitted to be carried away to exhaust and to be replaced by fresh air at a time in a manner to be described presently, whereas the major part of the air blanket is recirculated by the ventilator 20 again and again. Thereby the blanket of air actuated by the ventilator 20 takes up more and more of the odors, fumes or vapors until it is saturated or nearly saturated with these fumes or vapors. During this recirculation process the temperature of the blanket which at first may be substantially different from the temperature of the liquid in the tank will approach more and more this latter temperature. After a relatively short working period the blanket of air will be sufficiently laden with the fumes or vapors and its temperature will approximate that of the liquid in the tank to such an extent that this blanket will neither exert an appreciable cooling effect on the contents of the tank nor will there be any tendency to liberate from the liquid in the container more fumes or vapors than would be emitted if there were no air blanket forcibly moved over the surface of the liquid. In fact, the evaporation will be diminished in many cases by the presence of the blanket of warm and more or less saturated air.

The recirculating blanket of air will also tend to draw in air from the work space as indicated by the arrow 28 and thereby induce the formation of a second blanket of air immediately above the recirculating blanket moving along with the latter across the top of the tank. This second or induced blanket, under the action of the ventilator or bifurcator 26 in the second air duct 24 is drawn through the inlet opening 25 into the lower hood-shaped part 29 of the duct 24 and forced through the exhaust pipe 27 to discharge. The ventilator 26 in the exhaust air duct 24 is preferably of substantially lesser force than the ventilator 20 in the recirculating duct 17 and need be only strong enough to overcome any back pressure which would tend to impair the proper flow of the induced blanket. With such an arrangement, by far the major part of the air moved across the surface of the liquid in the tank will be recirculated by the ventilator 20 and only a small amount of air carrying with it that amount of odors, fumes or vapors which the recirculating blanket would not be able to hold without becoming eventually supersaturated will be carried out to exhaust by the ventilator 26 in the upper duct. It will be obvious that because of the low suction required for the ventilator 26 comparatively small quantities only of air are drawn in from the upper part of the work room during the operation of the device, whereby a greater efficiency of operation is achieved with a reduced power consumption and at the same time needless evaporation is avoided.

In order to assure that the blankets of air flowing across the top of the tank maintain uniform thickness and velocity throughout the length of the tank 10, the recirculating air duct 17 or preferably, as shown in the drawing, this duct 17 as well as the exhaust air duct 24, may be provided with partitioning means for dividing the duct or ducts lengthwise into a plurality of channels. That part of the lower or recirculating air duct 17 which extends from the inlet opening 18 to the bifurcator 20 is subdivided into substantially parallel channels by means of baffle plates 30, 31 which at the inlet opening 18 start in a vertical direction and then turn into the horizontal direction. Behind the bifurcator 20 similar baffle plates 32, 33 are arranged guiding the more or less vapor- and fume-laden air in parallel streams to the nozzle 19. Within this nozzle 19 the subdivision of the air flow is continued so that the air will leave the nozzle in a series of horizontal jets. For that purpose a number of vertical partitions 34 extending part way across the depth of the nozzle 19 are provided which divide the nozzle into a number of open ended cells 35 and, besides subdividing and directing the air, also serve as a reinforcing means for the top plate 22 of the nozzle 19. As shown in the drawing, the vertical partitions 34 may form part of a sheet of metal 36 which is cramped so as to form a series of U-shapes whose vertical legs form the aforementioned partitions 34 and whose horizontal sections 37 and 38 are fastened by welding or otherwise to the top plate 22 of the nozzle 19 and to the top of the tank 10, respectively. The exhaust hood 29 is subdivided by partitions 39 which in the region next to the inlet opening 25 extend substantially parallel to each other and behind said region are bent so as to converge on the ventilator 26. The front portion 40 of each partition 39 may be angularly adjustable, e. g. pivotally mounted at 41, so that the entrance areas and the direction of inflow may be varied for the different channels formed by the partitions 39 and thereby obstructions to the uniform flow of air, such as pipes passing into the tank in front of the inlet opening 25 or air currents in the work room, may be compensated for.

The front end of the hood 29 may be reinforced by an angle 42 which also aids in directing the flow of air into the inlet opening 25 of the upper air duct 24.

Projecting upwardly from the upper edges of the two end walls 14, 15 of the tank 10 or from positions near said edges are two shields 43 which extend over the whole width of the tank. In the vertical direction these shields reach at least as high as the top of the outlet nozzle 19 of the lower air duct 17 at the forward end and as high as the top of the inlet opening 25 of the upper air duct 24 at the rearward end of the tank 10. The shields 43 prevent the influx of any substantial quantities of air into the air blankets and also into the inlet openings 18 and 25 of the two ducts from the sides. Thereby dilution of the side zones of these blankets which would affect the uniformity of the blankets is avoided.

While I have shown in the drawing one particular embodiment of a device suitable for carrying out my new exhaust method, this embodiment has been given by way of example only and various changes, rearrangements and modifications may be made without departing from the spirit of the invention or from the scope of the appended claims. In particular, I desire it to be understood that while I have shown the two ventilators 20 and 26 to serve for the removal of odors, fumes or vapors from a single tank, the principle of my invention would not be changed by using one recirculating ventilator 20 and one exhaust ventilator 26 in combination with a plurality of tanks. It will be obvious that while in such a case each tank would have a recirculating duct 17 and an exhaust duct 24, all the recirculating ducts could be connected in parallel to the common recirculating ventilator 20 (i. e. all the outlet nozzles 21 conected in parallel to the pressure side and all the inlet openings 18 connected in parallel to the suction side of this ventilator) whereas all the exhaust ducts 24 would be connected in parallel to the common exhaust ventilator 26.

What I claim is:

1. In an exhaust system for the removal of odors, fumes or vapors arising from an open tank, two ducts having each an inlet opening and an outlet opening, a power driven ventilator in each of said ducts, the inlet openings of said two ducts extending over substantially the whole length of said tank and being arranged one closely above the other at the rear end of said tank near the top of the latter, the outlet opening of the duct containing the lower of said inlet openings extending over substantially the whole length of said tank near the top of the front end thereof, the duct containing the upper of said inlet openings emptying into an exhaust, and partitioning means in at least one of said two ducts for dividing said duct or ducts lengthwise into a plurality of channels.

2. In an exhaust system for the removal of odors, fumes or vapors arising from an open tank, two ducts having each an inlet opening and an outlet opening, a power driven ventilator in each of said ducts, the inlet openings of said two ducts extending over substantially the whole length of said tank and being arranged one closely above the other at the rear end of said tank near the top of the latter, the outlet opening of the duct containing the lower of said inlet openings extending over substantially the whole length of said tank near the top of the front end thereof, the duct containing the upper of said inlet openings emptying into an exhaust, and partitioning means dividing said last-named duct lengthwise into a plurality of channels which in the region close to the inlet opening of that duct extend substantially parallel to each other and behind said region converge in the ventilator in that duct.

3. In an exhaust system for the removal of odors, fumes or vapors arising from an open tank, two ducts having each an inlet opening and an outlet opening, a power driven ventilator on each of said ducts, the inlet openings of said two ducts extending over substantially the whole length of said tank and being arranged one closely above the other at the rear end of said tank near the top of the latter, the outlet opening of the duct containing the lower of said inlet openings extending over substantially the whole length of said tank near the top of the front end thereof, the duct containing the upper of said inlet openings emptying into an exhaust, and partitioning means dividing said last-named duct lengthwise into a plurality of channels which in the region close to the inlet opening of that duct extend substantially parallel to each other, the front portion of each of said partitioning means being angularly adjustable.

4. In an exhaust system for the removal of odors, fumes or vapors arising from an open tank, two ducts having each an inlet opening and an outlet opening, a power driven ventilator in each of said ducts, the inlet openings of said two ducts extending over substantially the whole length of said tank and being arranged one closely above the other at the rear end of said tank near the top of the latter, the outlet opening of the duct containing the lower of said inlet openings extending over substantially the whole length of said tank near the top of the front end thereof, the duct containing the upper of said inlet openings emptying into an exhaust, partitioning means dividing the duct containing the lower of said inlet openings lengthwise into a plurality of substantially parallel channels in front and behind the ventilator in this duct, and partitioning means dividing the duct containing the upper of said inlet openings lengthwise into a plurality of channels which in the region close to the inlet opening of that duct extend substantially parallel to each other and behind said region converge on the ventilator in that duct.

5. In an exhaust system for the removal of odors, fumes or vapors arising from an open tank, two ducts having each an inlet opening and an outlet opening, a power driven ventilator in each of said ducts, the inlet openings of said two ducts extending over substantially the whole length of said tank and being arranged one closely above the other at the rear end of said tank near the top of the latter, the outlet opening of the duct containing the lower of said inlet openings extending over substantially the whole length of said tank near the top of the front end thereof, the duct containing the upper of said inlet openings emptying into an exhaust, partitioning means dividing the duct containing the lower of said inlet openings lengthwise into a plurality of substantially parallel channels in front and behind the ventilator in this duct, partitioning means dividing the duct containing the upper of said inlet openings lengthwise into a plurality of channels which in the region close to the inlet opening of that duct extend substantially parallel to each other and behind said region converge on the ventilator in that duct, and shielding means projecting upwardly from the two end walls of said tank so as to prevent a substantial influx of air into said inlet openings from the sides.

6. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct and across the top of the tank as an air blanket which absorbs additional odors, fumes or vapors arising from the tank each time it passes over the tank, an exhaust duct having an inlet also extending along the entire rear edge of the tank and drawing the air in horizontally but located immediately above the inlet of said recirculation duct, means in said exhaust duct for drawing air over the blanket to catch any odors, fumes or vapors escaping from the said blanket and discharging the air at a point distant from the tank.

7. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct at a given rate and across the top of the tank as an air blanket which absorbs additional odors, fumes or vapors arising from the tank each time it passes over the tank, an exhaust duct having an inlet also extending along the entire rear edge of the tank and drawing the air in horizontally but located immediately above the inlet of said recirculation duct, means in said exhaust duct for moving air at a lower rate than that at which the first named blanket is being recirculated over the blanket to catch any odors, fumes or vapors escaping from the said blanket and discharging the air at a point distant from the tank.

8. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct and across the top of the tank as an air blanket which absorbs additional odors, fumes or vapors arising from the tank each time it passes over the tank, partitions in said duct dividing the air flowing out of the recirculating duct uniformly along the entire front edge of the tank and assuring that the air drawn into the duct at the rear edge is drawn in uniformly along the entire duct inlet, an exhaust duct having an inlet also extending along the entire rear edge of the tank and drawing the air in horizontally but located immediately above the inlet of said recirculation duct, means in said exhaust duct for drawing air over the blanket to catch any odors, fumes or vapors escaping from the said blanket and discharging the air at a point distant from the tank.

9. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct and across the top of the tank as an air blanket which absorbs additional odors, fumes or vapors arising from the tank each time it passes over the tank, partitions in said duct dividing the air flowing out of the recirculating duct uniformly along the entire front edge of the tank and assuring that the air drawn into the duct at the rear edge is drawn in uniformly along the entire duct inlet, a nozzle forming the outlet of said duct adapted to project the air horizontally across the tank and vertical partitions in the nozzle directing the air toward the rear of the tank, and exhaust duct having an inlet also extending along the entire rear edge of the tank and drawing the air in horizontally but located immediately above the inlet of said recirculation duct, means in said exhaust duct for drawing air over the blanket to catch any odors, fumes or vapors escaping from the said blanket and discharging the air at a point distant from the tank.

10. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct and across the top of the tank as an air blanket which absorbs additional odors, fumes or vapors arising from the tank each time it passes over the tank, partitions in said duct dividing the air flowing out of the recirculating duct uniformly along the entire front edge of the tank and assuring that the air drawn into the duct at the rear edge is drawn in uniformly along the entire duct inlet, a nozzle extending over the front edge of the tank and forming the outlet of said duct and also being subject to wear from work that is moved into the tank, a metal strip bent into horizontal and vertical sections, the vertical portions forming partitions to project the air horizontally toward the rear of the tank and also to support the upper side of the nozzle, and exhaust duct having an inlet also extending along the entire rear edge of the tank and drawing the air in horizontally but located immediately above the inlet of said recirculation duct, means in said exhaust duct for drawing air over the blanket to catch any odors, fumes or vapors escaping from the said blanket and discharging the air at a point distant from the tank.

11. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct at a given rate and across the top of the tank as an air blanket which absorbs additional odors, fumes or vapors arising from the tank each time it passes over the tank, an exhaust duct having an inlet also extending along the entire rear edge of the tank and drawing the air in horizontally but located immediately above the inlet of said recirculation duct, means in said exhaust duct for moving air at a lower rate than that at which the first named blanket is being recirculated over the blanket to catch any odors, fumes or vapors escaping from the said blanket and discharging the air at a point distant from the tank, shielding means projecting upward from the end walls of the tank to prevent the influx of air from the side into said air blanket.

12. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct and across the top of the tank as an air blanket which absorbs additional odors, fumes or vapors arising from the tank each time it passes over the tank, an exhaust duct having an inlet also extending along the entire rear edge of the tank and drawing the air in horizontally but located immediately above the inlet of said recirculation duct, means in said exhaust duct for drawing air over the blanket to catch any odors, fumes or vapors escaping from the said blanket and discharging the air at a point distant from the tank, partitions in said exhaust conduit that extend from the elongated inlet toward the air moving means, the partitions being normal to the inlet and converging as they approach the air moving means.

13. In an exhaust system designed to remove odors, fumes or vapors arising from an open tank, an open tank having a front and a rear edge, a recirculation duct having an inlet opening extending along the entire rear edge of the tank drawing air in horizontally and an outlet opening extending along the entire front edge of the tank discharging air horizontally, means for recirculating the air through the duct and across the top of the tank as an air blanket which absorbs additional odors, fumes or vapors arising from the tank each time it passes over the tank, partitions in said duct dividing the air flowing out of the recirculating duct uniformly along the entire front edge of the tank and assuring that the air drawn into the duct at the rear edge is drawn in uniformly along the entire duct inlet, an exhaust duct having an elongated inlet also extending along the entire rear edge of the tank and drawing the air in horizontally but located immediately above the inlet of said recirculation duct, means in said exhaust duct for drawing air over the blanket to catch any odors, fumes or vapors escaping from the said blanket and discharging the air at a point distant from the tank, partitions in said exhaust conduit that extend from the elongated inlet toward the air moving means, the partitions being normal to the inlet and converging as they approach the air moving means.

PHILIP A. SIDELL.

REFERENCES CITED

The following references are of record in the file of this patent:

UNITED STATES PATENTS

| Number | Name | Date |
|---|---|---|
| 1,173,555 | Caldwell | Feb. 29, 1916 |
| 1,254,725 | Pennock | Jan. 29, 1918 |
| 1,539,973 | Truxal | June 2, 1925 |
| 1,738,641 | Cowan | Dec. 10, 1929 |
| 2,074,317 | Allan et al. | Mar. 23, 1937 |
| 2,141,403 | Offen | Dec. 27, 1938 |
| 2,210,023 | Candor | Aug. 6, 1940 |

Certificate of Correction

April 19, 1949.

Patent No. 2,467,505.

PHILIP A. SIDELL

It is hereby certified that errors appear in the printed specification of the above numbered patent requiring correction as follows:

Column 8, lines 25 and 26, claim 9, and lines 58 and 59, claim 10, for the words "and exhaust" read *an exhaust*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*